US010080215B2

(12) United States Patent
Chen et al.

(10) Patent No.: US 10,080,215 B2
(45) Date of Patent: Sep. 18, 2018

(54) TRANSPORTATION OF USER PLANE DATA ACROSS A SPLIT FRONTHAUL INTERFACE

(71) Applicant: Nokia Technologies Oy, Espoo (FI)

(72) Inventors: David Chen, Wilmette, IL (US); Alan Rottinghaus, Barrington, IL (US); David Baietto, Crystal Lake, IL (US); Yuda Luz, Buffalo Grove, IL (US)

(73) Assignee: Nokia Technologies Oy, Espoo (FI)

( * ) Notice: Subject to any disclaimer, the term of this patent is extended or adjusted under 35 U.S.C. 154(b) by 78 days.

(21) Appl. No.: 15/229,327

(22) Filed: Aug. 5, 2016

(65) Prior Publication Data

US 2018/0042003 A1 Feb. 8, 2018

(51) Int. Cl.
| H04W 72/04 | (2009.01) |
| H04W 76/02 | (2009.01) |
| H04W 56/00 | (2009.01) |
| H04W 76/10 | (2018.01) |
| H04W 88/08 | (2009.01) |

(52) U.S. Cl.
CPC ..... *H04W 72/0413* (2013.01); *H04W 56/001* (2013.01); *H04W 72/042* (2013.01); *H04W 76/02* (2013.01); *H04W 76/10* (2018.02); H04W 88/085 (2013.01)

(58) Field of Classification Search
None
See application file for complete search history.

(56) References Cited

U.S. PATENT DOCUMENTS

| 5,557,798 A | * | 9/1996 | Skeen | G06F 3/0481 |
| | | | | 705/35 |
| 8,675,544 B1 | * | 3/2014 | Hirsch | H04B 7/2656 |
| | | | | 370/322 |
| 8,738,818 B2 | * | 5/2014 | Mahajan | G06F 11/221 |
| | | | | 710/15 |

(Continued)

FOREIGN PATENT DOCUMENTS

| WO | 2010/101328 A1 | 9/2010 |
| WO | 2015/044871 A1 | 4/2015 |
| WO | 2016/003983 A1 | 1/2016 |

OTHER PUBLICATIONS

International Search Report and Written Opinion received for corresponding Patent Cooperation Treaty Application No. PCT/FI2017/050544, dated Oct. 11, 2017, 12 pages.

(Continued)

*Primary Examiner* — Bunjob Jaroenchonwanit
(74) *Attorney, Agent, or Firm* — Locke Lord LLP

(57) ABSTRACT

This specification describes a method comprising generating a first packet based on user plane data relating to a single user which is output by a first L1 PHY processing stage, the first packet including a proper subset of the user plane data which is to be transmitted to the user equipment during a first time-slot symbol; passing the first packet to a second L1 PHY processing stage across a split fronthaul interface in a first time period having a duration corresponding to a duration of transmission of the first time-slot symbol; and passing one or more subsequent packets including the remainder of the user plane data across the split fronthaul interface in one or more successive time periods which are immediately subsequent to the first time period.

20 Claims, 9 Drawing Sheets

(56) References Cited

U.S. PATENT DOCUMENTS

| | | | | |
|---|---|---|---|---|
| 9,264,190 | B2* | 2/2016 | Camarda | H04L 5/0007 |
| 9,515,843 | B2* | 12/2016 | Diab | H04L 12/40136 |
| 9,648,514 | B2* | 5/2017 | Blankenship | H04L 69/322 |
| 9,838,262 | B2* | 12/2017 | Bi | H04L 12/4633 |
| 2005/0068974 | A1* | 3/2005 | Barker | H04L 49/103 |
| | | | | 370/419 |
| 2005/0141560 | A1* | 6/2005 | Muthiah | H04L 47/10 |
| | | | | 370/474 |
| 2008/0064390 | A1* | 3/2008 | Kim | H04W 60/00 |
| | | | | 455/425 |
| 2008/0318589 | A1* | 12/2008 | Liu | H04W 88/08 |
| | | | | 455/453 |
| 2010/0067539 | A1* | 3/2010 | Lin | H04L 49/90 |
| | | | | 370/419 |
| 2010/0135251 | A1* | 6/2010 | Sambhwani | H04W 8/26 |
| | | | | 370/331 |
| 2010/0197239 | A1* | 8/2010 | Catovic | H04W 24/08 |
| | | | | 455/67.11 |
| 2010/0250646 | A1* | 9/2010 | Dunagan | H04L 67/2804 |
| | | | | 709/203 |
| 2010/0315997 | A1* | 12/2010 | Kim | H04N 21/43615 |
| | | | | 370/328 |
| 2012/0051210 | A1* | 3/2012 | Komatsu | H04L 1/1621 |
| | | | | 370/216 |
| 2012/0135740 | A1* | 5/2012 | Hellwig | H04W 72/0433 |
| | | | | 455/445 |
| 2013/0288729 | A1* | 10/2013 | Islam | H04W 76/022 |
| | | | | 455/509 |
| 2014/0047061 | A1* | 2/2014 | Ehrlich | H04L 67/322 |
| | | | | 709/213 |
| 2014/0108878 | A1* | 4/2014 | Liu | H04L 1/16 |
| | | | | 714/748 |
| 2014/0192851 | A1* | 7/2014 | Tahir | H04L 1/0001 |
| | | | | 375/224 |
| 2014/0204952 | A1* | 7/2014 | Gacanin | H04B 3/542 |
| | | | | 370/400 |
| 2014/0226481 | A1* | 8/2014 | Dahod | H04W 36/0055 |
| | | | | 370/235 |
| 2014/0334305 | A1* | 11/2014 | Leroudier | H04W 24/00 |
| | | | | 370/235 |
| 2015/0133128 | A1* | 5/2015 | Xiong | H04W 76/02 |
| | | | | 455/444 |
| 2015/0146520 | A1* | 5/2015 | Zakrzewski | H04W 24/04 |
| | | | | 370/221 |
| 2015/0215918 | A1* | 7/2015 | Wu | H04W 72/0433 |
| | | | | 370/329 |
| 2015/0281953 | A1* | 10/2015 | Liu | H04W 76/023 |
| | | | | 380/283 |
| 2015/0326417 | A1* | 11/2015 | Banerjea | H04L 27/2613 |
| | | | | 370/474 |
| 2015/0382189 | A1* | 12/2015 | Zhang | H04W 12/04 |
| | | | | 380/285 |
| 2016/0134546 | A1* | 5/2016 | Anderson | H04L 47/12 |
| | | | | 370/235 |
| 2016/0156503 | A1* | 6/2016 | Rosa de Sousa Teixeira | H04L 41/5025 |
| | | | | 370/216 |
| 2016/0179427 | A1* | 6/2016 | Jen | G06F 3/0625 |
| | | | | 711/147 |
| 2016/0205570 | A1* | 7/2016 | Bedekar | H04W 24/02 |
| | | | | 370/252 |
| 2017/0185556 | A1* | 6/2017 | Buttner | G06F 13/4022 |

OTHER PUBLICATIONS

"Massive MIMO Architecture", 3GPP TSG-RAN WG1 #85, R1-164707, Agenda Item: 7.1.6, Qualcomm Incorporated, May 23-27, 2016, 8 pages.

"3rd Generation Partnership Project;Technical Specification Group Radio Access Network;Evolved Universal Terrestrial Radio Access (E-UTRA);Physical layer procedures (Release 13)", 3GPP TS 36.213, V13.1.1, Mar. 2016, pp. 1-361.

Chang et al., "Impact of Packetization and functional split on C-RAN Fronthaul Performance", IEEE International Conference on Communications (ICC), 2016, pp. 1-7.

Jaber et al., "A Joint Backhaul and RAN Perspective on the Benefits of Centralised RAN Functions", IEEE International Conference on Communications Workshops, May 23-27, 2016, 6 pages.

Vu et al., "Power Optimization With BLER Constraint for Wireless Fronthauls in C-RAN", IEEE Communications Letters, 2016, 4 pages.

* cited by examiner

Figure 6

Legacy Method Example: Rank 2, 64QAM, CR=.92, 1 UE (150Mbps)

Example of legacy packet 301, 302

Symbol-by-symbol Method Example: Rank 2, 64QAM, CR=.92, 1 UE (150Mbps)

Example of Symbol-by-symbol user data plane packet 401, 402

TRANSPORTATION OF USER PLANE DATA ACROSS A SPLIT FRONTHAUL INTERFACE

FIELD

This specification relates to the transportation of user plane data across a split L1 PHY fronthaul interface.

BACKGROUND

Distributed Base Stations are based on an architecture in which the radio function unit, also known as the remote radio head (RRH), is physically separated from the digital function unit, or baseband unit (BBU). For instance, the RRH can be installed on the top of tower close to the antenna, thereby reducing the loss when compared to traditional base stations in which RF signals have to travel through a long cable from the base station cabinet to the antenna.

C-RAN (Cloud or Centralized radio access network) is an architectural evolution of the distributed base station that allows BBUs to be significantly further away from the RRH, thereby enabling large scale centralised base station deployment.

3GPP has defined various L1 PHY and L2 functions for 4G LTE, along with protocols for the handling of information among the layers. However, the deployment architecture for realizing these functions in a physical system, which includes the fronthaul (FH) connection between the centralized baseband processing and RRH, is not specified. This flexibility means that not all baseband processing functions must necessarily be centralized away from the RRH, and instead the baseband processing functions may be divided between a centralised location and co-location with the RRH. The same is true for 5G networks.

SUMMARY

In a first aspect, this specification describes a method comprising generating a first packet based on user plane data relating to one or more user equipment which is output by a first L1 PHY processing stage, the first packet including a proper subset of the user plane data which is to be transmitted to the one or more user equipment during a first time-slot symbol. The method further comprises passing the first packet to a second L1 PHY processing stage across a split fronthaul interface in a first time period having a duration corresponding to a duration of transmission of the first time-slot symbol, and passing one or more subsequent packets including the remainder of the user plane data across the split fronthaul interface in one or more successive time periods which are immediately subsequent to the first time period.

The method may further comprise passing control information across the split fronthaul interface at the latest during the first time period, the control information being for enabling the second processing stage to begin processing the subset of user plane data prior to receipt of the one or more subsequent packets.

In a second aspect, this specification describes apparatus comprising at least one processor, and at least one memory including computer program code which, when executed by the at least one processor, causes the apparatus: to generate a first packet based on user plane data relating to one or more user equipment which is output by a first L1 PHY processing stage, the first packet including a proper subset of the user plane data which is to be transmitted to the one or more user equipment during a first time-slot symbol; to pass the first packet to a second L1 PHY processing stage across a split fronthaul interface in a first time period having a duration corresponding to a duration of transmission of the first time-slot symbol; and to pass one or more subsequent packets including the remainder of the user plane data across the split fronthaul interface in one or more successive time periods which are immediately subsequent to the first time period.

The computer program code, when executed by the at least one processor, may further cause the apparatus: to pass control information across the split fronthaul interface at the latest during the first time period, the control information being for enabling the second processing stage to begin processing the subset of user plane data prior to receipt of the one or more subsequent packets.

In the method of the first aspect or the apparatus of the second aspect, the control information may be passed across the interface as a separate packet prior to the first time period. Alternatively, the control information may be included in the first packet with the proper subset of user plane data. In either alternative, the control information may enable the second processing stage to process the first packet and the one or more subsequent packets. In such examples, the first packet and/or the subsequent packets may include information which refers to the control information. The information which refers to the control information may, for instance, identify the user equipment to which the user plane data carried in the packet is to be transmitted.

In examples in which the control information is included in the first packet, each of the subsequent packets may include control information for enabling the second processing stage to begin processing the subsequent packets prior to receipt of one or more later-received subsequent packets. In examples in which the separate packet including the control information is passed across the interface in the time period that is prior to the first time period, it may be passed in the time period that is prior to the first time period along with another packet which includes L2 packet scheduler downlink control information.

The second L1 PHY processing stage may be located remotely from the first L1 PHY processing stage. Alternatively or additionally, the user plane data may be output by the first L1 PHY processing stage as one or more codewords. In such examples, the first L1 PHY processing stage may be a scrambling stage with the second L1 PHY processing stage being a modulation stage. Alternatively, the first L1 PHY processing stage may be downstream from a scrambling stage or may be upstream from a scrambling stage. For instance, the first L1 PHY processing stage may be a channel coding stage and the user plane data may be in the form of multiple code blocks. In such examples, each code block may include an amount of user plane data that is less than or equal to an amount of data that can be carried in a payload of a packet transmitted as a single time-slot symbol.

The first packet may be generated using information received from an L2 packet scheduler. In such examples, the information received from the L2 packet scheduler may include all or any combination of: information indicative of a number of user equipments, UEs, allocated to a transmission time interval, TTI, during which the time-slot symbols carrying the user plane data are to be transmitted to a UE; information indicative of a modulation and coding scheme allocated for each of the UEs allocated to the TTI; information indicative of a multiple-input-multiple output, MIMO, scheme or a transmission diversity scheme employed for transmission of the time-slot symbols carrying the user plane data; information indicative of resource block allocation for each UE; information indicative of beamforming specific parameters employed for transmission of the time-slot symbols carrying the user plane data; and information indicative of a number of time-slot symbols that are reserved for a physical downlink control channel, PDCCH.

The first packet may also or alternatively be generated based on pre-configuration information which may include includes all or any combination of: information indicative of channel bandwidth which is to be utilised for transmission of the time-slot symbols carrying the user plane data; information indicative of a duplexing scheme which is to be utilised for transmission the time-slot symbols carrying the user plane data; information indicative of available transport block sizes for transmission of the time-slot symbols carrying the user plane data; and information indicative of cooperative features which are to be utilised for transmission of the time-slot symbols carrying the user plane data.

The first packet may also or alternatively be generated based on information relating to processing to be performed by one or more L1 PHY processing stages downstream from the first L1 PHY processing stage. In such examples, the information relating to processing to be performed by one or more L1 PHY processing stages downstream from the first processing stage may include all or any combination of: information indicative of a modulation scheme to be utilised for converting the packets into corresponding modulation symbols; information indicative of a scheme to be utilised for assigning the modulation symbols to one or more layers; information indicative of a scheme to be utilised for applying precoding to the modulation symbols in each layer and for mapping the pre-coded symbols to appropriate antenna ports; and information indicative of a scheme to be utilised for assigning the modulation symbols on a resource grid to be transmitted on each antenna port to specific resource elements. In a third aspect, this specification describes a method: receiving, at a second L1 PHY processing stage from across a split fronthaul interface, a first packet including a proper subset of user plane data output by a first L1 PHY processing stage which is upstream of the split fronthaul interface, wherein the user plane data relates to one or more user equipment and wherein the proper subset of the user plane data is to be transmitted to at least one of the one or more user equipment as a first time-slot symbol, wherein the first packet is received in a first time period having a duration corresponding to a duration of transmission of the first time-slot symbol; starting to process the first data packet prior to expiry of a second time period that is immediately subsequent to the first time period and which has a duration corresponding to a duration of transmission of a second time-slot symbol; and receiving one or more subsequent packets, which together include the remainder of the user plane data, from across the split fronthaul interface, at least one of the one or more subsequent packets being received during the second time period, wherein the user plane data included in the at least one subsequent packet received during the second time period is to be transmitted to the at least one user equipment as the second time-slot symbol. The method may further comprise processing the first data packet based on control information received from across the split fronthaul interface at the latest during the first time period.

In a fourth aspect, this specification describes apparatus comprising at least one processor, and at least one memory including computer program code which, when executed by the at least one processor, causes the apparatus to receive, at a second L1 PHY processing stage from across a split fronthaul interface, a first packet including a proper subset of user plane data output by a first L1 PHY processing stage which is upstream of the split fronthaul interface, wherein the user plane data relates to one or more user equipment and wherein the proper subset of the user plane data is to be transmitted to at least one of the one or more user equipment as a first time-slot symbol, wherein the first packet is received in a first time period having a duration corresponding to a duration of transmission of the first time-slot symbol; to begin processing of the first data packet prior to expiry of a second time period that is immediately subsequent to the first time period and which has a duration corresponding to a duration of transmission of a second time-slot symbol; and to receive one or more subsequent packets, which together include the remainder of the user plane data, from across the split fronthaul interface, at least one of the one or more subsequent packets being received during the second time period, wherein the user plane data included in the at least one subsequent packet received during the second time period is to be transmitted to the at least one user equipment as the second time-slot symbol.

The computer program code, when executed by the at least one processor, may cause the apparatus to pass control information across the split fronthaul interface at the latest during the first time period, the control information being for enabling the second processing stage to begin processing the subset of user plane data prior to receipt of the one or more subsequent packets.

In a fifth aspect, this specification describes apparatus configured to perform any method as described with reference to the first or third aspects.

In a sixth aspect, this specification describes computer-readable instructions which, when executed by computing apparatus, cause the computing apparatus to perform any method as described with reference to the first or third aspects.

In a seventh aspect, this specification describes a computer-readable medium having computer-readable code stored thereon, the computer-readable code, when executed by at least one processor, causing performance of at least: generating a first packet based on user plane data relating to one or more user equipment which is output by a first L1 PHY processing stage, the first packet including a proper subset of the user plane data which is to be transmitted to the one or more user equipment during a first time-slot symbol; passing the first packet to a second L1 PHY processing stage across a split fronthaul interface in a first time period having a duration corresponding to a duration of transmission of the first time-slot symbol; and passing one or more subsequent packets including the remainder of the user plane data across the split fronthaul interface in one or more successive time periods which are immediately subsequent to the first time period.

In an eighth aspect, this specification describes a computer-readable medium having computer-readable code stored thereon, the computer-readable code, when executed by at least one processor, causing performance of at least: to receive, at a second L1 PHY processing stage from across a split fronthaul interface, a first packet including a proper subset of user plane data output by a first L1 PHY processing stage which is upstream of the split fronthaul interface, wherein the user plane data relates to one or more user equipment and wherein the proper subset of the user plane data is to be transmitted to at least one of the one or more user equipment as a first time-slot symbol, wherein the first packet is received in a first time period having a duration corresponding to a duration of transmission of the first time-slot symbol; beginning processing of the first data packet prior to expiry of a second time period that is immediately subsequent to the first time period and which has a duration corresponding to a duration of transmission of a second time-slot symbol; and receiving one or more subsequent packets, which together include the remainder of the user plane data, from across the split fronthaul interface, at least one of the one or more subsequent packets being received during the second time period, wherein the user plane data included in the at least one subsequent packet received during the second time period is to be transmitted to the at least one user equipment as the second time-slot symbol. The computer-readable code stored on the medium of the eighth aspect may further cause performance of any of the operations described with reference to the method of the third aspect.

In a ninth aspect, this specification describes apparatus comprising: means for generating a first packet based on user plane data relating to one or more user equipment which is output by a first L1 PHY processing stage, the first packet including a proper subset of the user plane data which is to be transmitted to the one or more user equipment during a first time-slot symbol; means for passing the first packet to a second L1 PHY processing stage across a split fronthaul interface in a first time period having a duration corresponding to a duration of transmission of the first time-slot symbol; and means for passing one or more subsequent packets including the remainder of the user plane data across the split fronthaul interface in one or more successive time periods which are immediately subsequent to the first time period. The apparatus of the ninth aspect may further comprise means for causing performance of any of the operations described with reference to the method of the first aspect.

In a tenth aspect, this specification describes apparatus comprising: means for receiving, at a second L1 PHY processing stage from across a split fronthaul interface, a first packet including a proper subset of user plane data output by a first L1 PHY processing stage which is upstream of the split fronthaul interface, wherein the user plane data relates to one or more user equipment and wherein the proper subset of the user plane data is to be transmitted to at least one of the one or more user equipment as a first time-slot symbol, wherein the first packet is received in a first time period having a duration corresponding to a duration of transmission of the first time-slot symbol; means for beginning processing of the first data packet prior to expiry of a second time period that is immediately subsequent to the first time period and which has a duration corresponding to a duration of transmission of a second time-slot symbol; and means for receiving one or more subsequent packets, which together include the remainder of the user plane data, from across the split fronthaul interface, at least one of the one or more subsequent packets being received during the second time period, wherein the user plane data included in the at least one subsequent packet received during the second time period is to be transmitted to the at least one user equipment as the second time-slot symbol. The apparatus of the tenth aspect may further comprise means for causing performance of any of the operations described with reference to the method of the third aspect.

BRIEF DESCRIPTION OF FIGURES

For better understanding of the present application, reference will now be made by way of example to the accompanying drawings in which:

FIG. 6 is an example of mapping between code blocks and time-slot symbols when the split fronthaul interface is located between the channel coding and rate matching stages;

DETAILED DESCRIPTION

Figure 1:
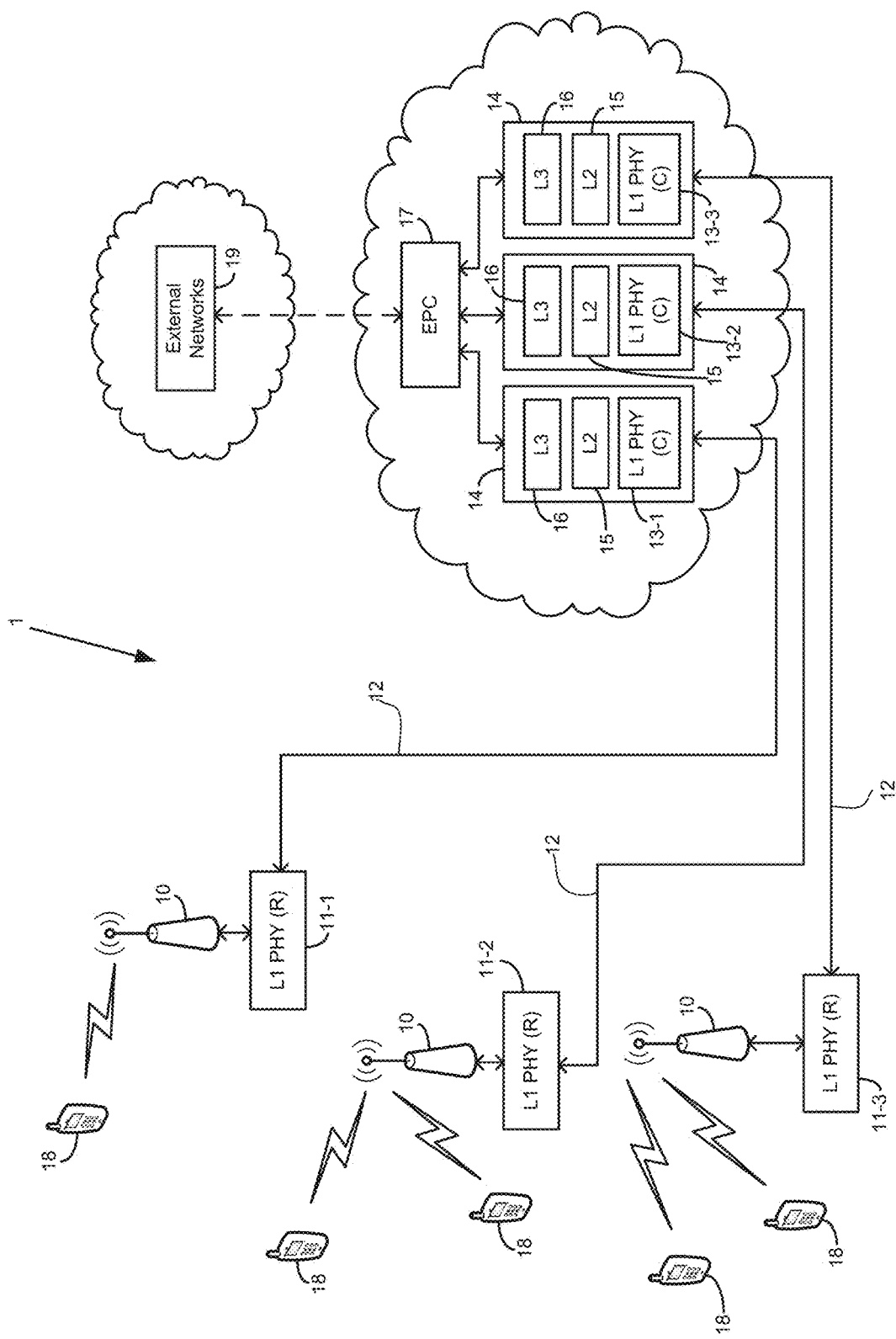
FIG. 1 is a schematic illustration of an example of a C-RAN architecture including plural remote radio heads each locally coupled with a respective remote L1 PHY processing apparatus, which is connected via a split fronthaul interface to a corresponding centralised L1 PHY processing apparatus.

In the description and drawings, like reference numerals refer to like elements throughout.

FIG. 1 is a schematic illustration of an example of a C-RAN architecture 1 including plural remote radio heads (RRHs) 10 each locally coupled with a remote L1 PHY processing apparatus 11 which is connected via a fronthaul interface 12 to a corresponding centralised L1 PHY processing apparatus 13.

Each of the centralised L1 PHY processing apparatuses 13 may form part of a centralised baseband processing apparatus 14. The centralised baseband (BB) processing apparatus 14 may additionally include the L2 and L3 functions 15, 16. The centralised BB processing apparatus 14 may be communicatively couple to an evolved packet core (EPC) 17. The EPC 17 is communicatively coupled to one or more external networks, such as the internet.

Each of the RRHs 10 is configured to service one or more user equipment (UE) 18. In this way, the UEs 18 are able to transmit data to and receive data from the external networks 19, via the RRH 10, the remote L1 PHY processing apparatus 11, the BB processing apparatus 14 and the EPC 17. As such, each of the remote and centralised L1 PHY processing apparatuses 13, 14, and the L2 and L3 processing apparatuses 15, 16 are configured to enable both the uplink of data from the UEs 18 towards the EPC 17 and the downlink of data from the EPC 17 towards the UEs 18.

Each of the remote and centralised L1 PHY processing apparatuses 13, 14, and the L2 and L3 processing apparatuses 15, 16 include various processing stages for processing data along its path to/from the UE. This specification is primarily concerned with the L1 PHY processing stages (and to a lesser extent the L2 processing stages) and, as such, the L3 processing is not discussed in any detail herein.

Figure 2:
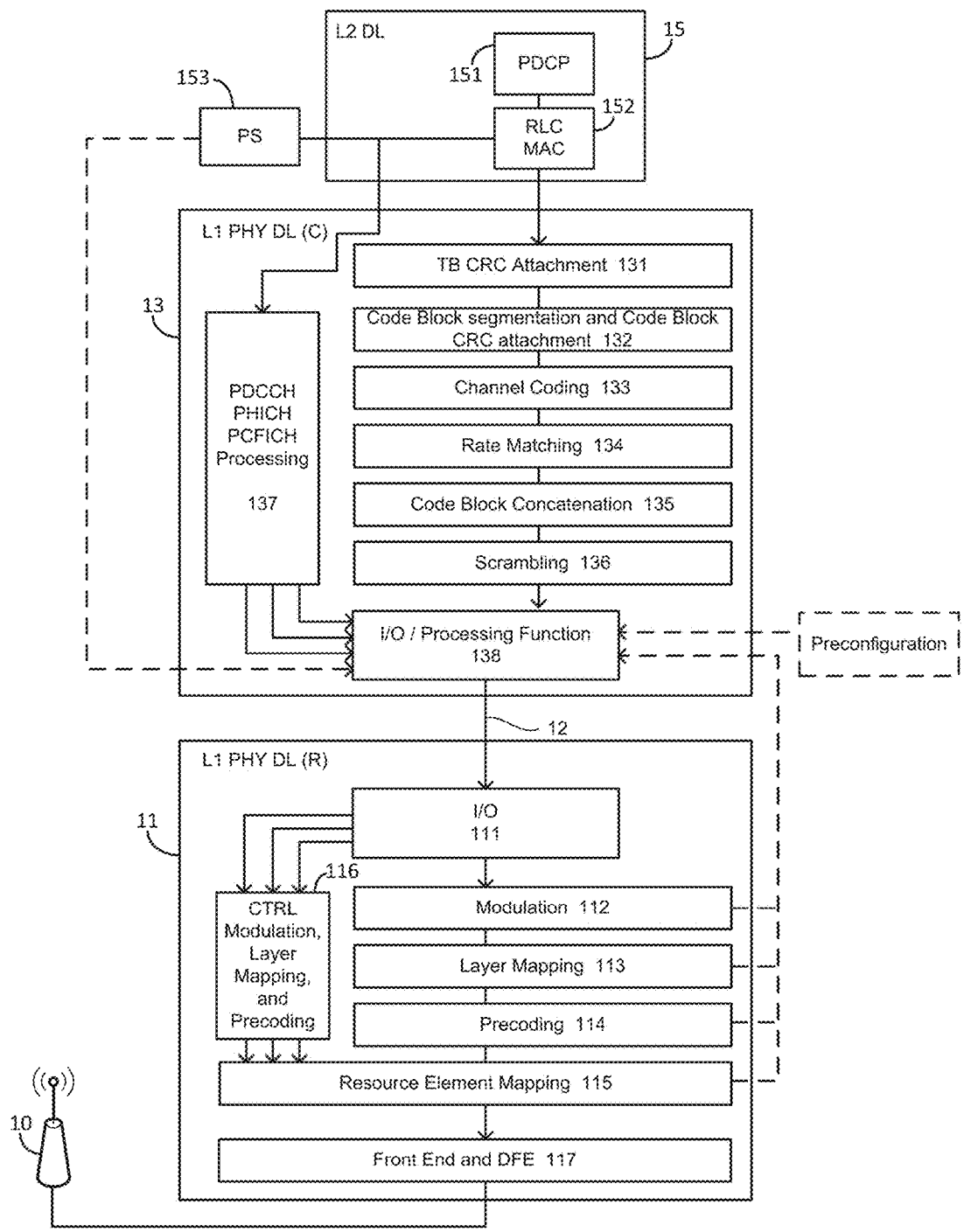
FIG. 2 is a schematic illustration of an example of a division of L1 PHY processing stages between the remote and centralised L1 PHY processing apparatuses.

FIG. 2 illustrates various L1 PHY downlink processing stages which may be employed in a 4G or 5G C-RAN base station configuration to transfer data from the L2 processing apparatus 15 in a downstream direction towards the RRH 10. The L1 PHY downlink processing stages may include control channel data processing stages 137, 116 and user plane data processing stages 131, 132, 133, 134, 135, 136, 112, 113, 114. The L1 PHY downlink processing stages may further include processing stages which process both control channel data and user plane data 138, 111, 115, 117.

The user plane data processing stages may include, in a downstream direction, a transport block CRC attachment stage 131, a code block segmentation and code block CRC attachment stage 132, a channel coding stage 133, a rate matching stage 134, a code block concatenation stage 135, a scrambling stage 136, a modulation stage 112, a layer mapping stage 113, and a precoding stage 114.

The control channel data processing stages 137, 116 may include a Physical Downlink Control Channel (PDDCH), Physical Hybrid-ARQ Indicator Channel (PHICH) Physical Control Format Indicator Channel (PCFICH) processing stage 137 and a PDDCH, PHICH, PCFICH modulation, layer mapping and precoding stage 116. Although each of these processing stages are shown as a single functional block, in reality each of the different types of control information might be processed separately (as illustrated by the three outputs from the PDDCH, PHICH, PCFICH processing stage 137). Moreover, each of the different types of processing (e.g. modulation, layer mapping and precoding) may be performed by different functional blocks.

The joint control channel data and user plane data processing stages 138, 111, 115, 117 may include a fronthaul interface output processing stage 138 configured to process data received from the upstream processing stages and to pass or transport the processed data across the split fronthaul interface 12. At the downstream end of the split fronthaul interface 12 may be a fronthaul interface input processing stage 111, which may be configured to receive the data which has been passed across the split fronthaul interface and direct it to the relevant downstream processing stages (e.g. dependent on whether it is user plane data or control channel data). Additionally, the joint control channel data and user plane data processing stages may include a resource element mapping stage 115 which receives data from the precoding stage 114 and the PDDCH, PHICH, PCFICH modulation, layer mapping and precoding stage 116. After processing, the resource element mapping stage 115 may pass the processed data to another joint control channel data and user plane data stage, the front end and digital front end (DFE) stage 117, which outputs data for transmission by the RRH 10.

FIG. 2 also shows an example of a possible division of L1 PHY processing stages between the remote and centralised L1 PHY processing apparatuses 11, 13. In this example, the division occurs between the scrambling stage 136 and the modulation stage 112. However, as will be appreciated (for instance, from the later discussion with respect to FIG. 5) the split in L1 PHY processing stages may alternatively be in a different location.

The following is an explanation as to how the user plane data may be transferred across the interface 12 on a symbol-by-symbol basis. The numbering of the various packets is taken from FIGS. 4A and 4B although, as will be appreciated, those Figures depict only one possible example as to how the symbol-by-symbol data transfer may be achieved.

The fronthaul interface output processing stage 138, which forms part of the centralised L1 PHY processing apparatus 13, is configured to generate at least one first user plane data packet 401A, 401B (sometimes referenced 401) based on user plane data 300 which is output by a first L1 PHY processing stage, which in the example of FIG. 2 is the scrambling stage 138). The user plane data 300 that is output by the first L1 PHY processing stage is for transmission to one or more UE 18 and each of the at least one first user plane data packet 401 includes a proper subset of the user plane data 300 which will be transmitted from the RRH 10 to at least one of the one or more UE 18 during a first time-slot symbol (such as, but not limited to an LTE OFDM symbol).

Once generated, the at least one first user plane data packet 401 is sent to a second/recipient L1 PHY processing stage across the split fronthaul interface 12. In the example of FIG. 2, the recipient L1 PHY processing stage is the modulation stage 112. The at least one first user plane data packet 401 is sent to the fronthaul interface (from where it passes to the second/recipient L1 PHY processing stage) in a first time period (denoted Slot 1, Symbol 1 in FIG. 4A) which has a duration corresponding to a duration of transmission of the first time-slot symbol.

After sending the at least one first user plane data packet 401 in the first time period, one or more subsequent user plane data packets 402, which together include the remainder of the user plane data 300 are sent to the split fronthaul interface 12 (from where they pass to the to the second/recipient L1 PHY processing stage). At least one of the subsequent user plane data packets 402 is sent in each of one or more immediately subsequent time periods, each of which has a duration corresponding to a duration of transmission of a time-slot symbol in which the portion of user plane data included in the at least one subsequent user plane data packet 402 is to be transmitted by the RRH to the at least one of the UEs 18.

The time periods in which the first user plane data packet(s) 401 and the one or more subsequent user plane data packets 402 are sent across the interface may be successive and may follow directly one from another such that there are no intervals between successive time periods. In addition, the amount of user plane data carried by the combination of the one or more user plane data packets sent in each time period may be substantially the same. Consequently, the data that is sent across the split fronthaul interface may be considered as a data stream having a near-constant bandwidth. Moreover, as the user plane data sent across the interface 12 (in one or more user plane data packets 401, 402) in each time period is to be transmitted to the UE 18 in a separate time-slot symbol, the transfer of user plane data across the split fronthaul interface 12 could be said to be on a symbol-by-symbol basis.

The recipient L1 PHY processing stage at the remote L1 PHY processing apparatus 11 (which, in the example of FIG. 2 is the modulation stage 112) receives the first user plane data packet(s) 401 and the one or more subsequent user plane data packets 402 from the split fronthaul interface (via the fronthaul interface input stage 111), in respective successive time periods corresponding to the time periods in the which the user plane data packets were sent across the interface 12.

The recipient L1 PHY processing stage is configured to begin processing the first user plane data packet(s) 401

(which is received in a first time period), prior to the expiry of the subsequent time period, in which at least one subsequent user plane data packet 402 is received. Similarly, the recipient L1 PHY processing stage begins to process the subsequent user plane data packet(s) 402 prior to expiry of the next time period (in which the next at least one subsequent user plane data packet is received). The user plane data packets 401, 402 are thus processed as a data stream.

After processing by recipient L1 PHY processing stage, the processed data packet(s) received in the first/subsequent time periods are passed to the next L1 PHY processing stage (in the example of FIG. 2, the layer mapping stage 113).

In legacy systems, which employ "burst" (or high bandwidth, low time) transfer of data between L1 PHY processing stages (for instance, as illustrated and discussed with reference to FIGS. 3A and 3B), the L1 PHY processing stages prior to the resource mapping processing stage 115 process user plane data on a block by block basis as it is received at the respective processing stage. However, by processing and passing the user plane data across the fronthaul interface 12 on a symbol-by-symbol basis (i.e. such that 1 TTI-worth of data is transferred over approximately 1 TTI of time) various benefits may be achieved. For instance, the bandwidth requirements on the fronthaul interface may be relaxed because the user plane data is no longer being transferred as bursts but is instead being performed in in lock step with the over-the-air transmission from the RRH 10. In addition, by transferring user plane data on a symbol-by-symbol basis, data may be transferred across the fronthaul interface 12 at a roughly constant rate (when compared to legacy systems). This allows the recipient L1 PHY processing stage to process the user plane data in a more uniform and predictable way. It may be beneficial to increase the uniformity and predictability of workload as it may allow a reduction in the extent to which the target hardware architecture is required to be over-dimensioned in order to consume a given workload in an allotted time period. For example, in a "burst-type" (high bandwidth, low time) scheme, the hardware might be dimensioned to consume the entire workload in a duration that is reduced by the transport time of the data (i.e. no overlap between transmission time and processing time). As such, the hardware capacity is effectively inflated due to the loss of processing time opportunity while waiting for data. However, by spreading the workload more uniformly, the hardware may be dimensioned to perform processing almost entirely overlapped with the reception of new data (see, for instance, FIG. 4B). This may effectively give the hardware additional time to consume the overall workload. Another potential benefit is that, because the fronthaul interface 12 may typically be a packetized interface (for instance, but not limited to an Ethernet interface), the interface prefers a uniform and predictable workload instead of burst-type workload. Indeed, burst-type workloads often result in queuing delay at the packetized interface, while uniform & predictable load may reduce occurrences of such delays.

It should also be noted that the transfer of data on a symbol-by-symbol basis may not detract from the available end-to-end pipeline processing time within a HARQ loop (which is approximately 3 ms for 4G). Whereas, if the bursts of data in legacy systems were to be transferred with a lower bandwidth, this additional transfer time would detract from the available end-to-end pipeline processing time with the HARQ loop.

In order to enable the second/recipient L1 PHY processing stage to process the received user plane data on a symbol-by-symbol basis, control information may be passed across the split fronthaul interface at the latest during the first time period (during which the first user plane data packet(s) 401 is transferred). This control information, which may be referred to as service access point (SAP) control information enables the recipient L1 PHY processing stage to begin processing the received first user plane data packet(s) 401 prior to receipt of the one or more subsequent user plane data packets 402. This SAP control information may be received at the fronthaul interface output processing stage 138 directly from the packet scheduler 153, or indirectly via the L2 processing apparatus 14.

In some examples, the SAP control information is passed across the fronthaul interface 12 as a control information packet 400 prior to the first time period (in which the first user plane data packet(s) is sent). Alternatively, the SAP control information may be included in the first user plane data packet(s) 401 with the proper subset of the user plane data. The SAP control information, whether provided in the first user plane data packet 401 or prior to the first time period in a separate control information packet 400, is sufficient to enable the recipient L1 PHY processing stage to process the both the first user plane data packet 401 and the one or more subsequent user plane data packets 402. In such examples, the subsequent user plane data packets 402 may each include information which enables the recipient L1 PHY processing stage 112 to identify a portion of the SAP control information which relates to the particular user plane data packet. Similarly, the first user plane data packet 401 may also include such information. This information may, for instance, identify the UE for which the user plane data carried in the user plane data packet is intended.

In examples in which the SAP control information is passed across the fronthaul interface 12 as the separate control information packet 400, the control information packet 400 may be passed to the fronthaul interface 12 in a time period that is prior to the first time period (in which the first user plane data packet(s) is sent) along with another control information packet 405 which includes L2 packet scheduler downlink control information (e.g. PDCCH, PCFICH, PHICH etc.). The time period during which the control information packets 400, 405 are transferred to the interface 12 may be the time period immediately preceding the first time period (in which the first user plane data packet(s) is sent) and may have a duration corresponding to the duration of transmission of a time-slot symbol. This preceding time period is denoted Slot 0, Symbol 0 in FIG. 4A.

In other examples, a control information packet 400 including the SAP control information may not be transferred prior to the transfer of the first and subsequent user plane data packets 401, 402. Instead, each of the first and one or more subsequent user plane packets 401, 402 may include a portion of SAP control information for enabling the recipient L1 PHY processing stage to begin processing the respective packet 401, 402 prior to receipt of a subsequent user plane data packet in the subsequent time period.

The SAP control information, which may be received from the packet scheduler 153, may include all or any combination of one or more of:

information indicative of the number of user equipments, UEs, allocated to a transmission time interval, TTI (also referred to as a subframe), during which the time-slot symbols carrying the user plane data are to be transmitted to a UE;

information indicative of the modulation and coding scheme allocated for each of the UEs allocated to the TTI;

information indicative of the multiple-input-multiple output, MIMO, scheme or the transmission diversity scheme employed for transmission of the time-slot symbols in which the user plane data is to be transmitted;

information indicative of resource block allocation for each UE;

information indicative of beamforming specific parameters employed for transmission of the time-slot symbols in which the user plane data is to be transmitted; and information indicative of a number of symbols that are reserved for a physical downlink control channel, PDCCH (e.g. the PDCCH control frame indicator (CFI)).

In addition to being passed across the fronthaul interface 12, the information received from the packet scheduler 153 may additionally be utilised by the fronthaul interface output processing stage 138 to divide the user plane data received from the first L1 PHY processing stage (in the example of FIG. 2, the scrambling stage) thereby to generating the first and subsequent user plane data packets 401, 402. Generation of the first and subsequent user plane data packets 401, 402 may comprise selecting, based on the information received from, for instance, the packet scheduler a proper subset of the bits of the user plane data and encapsulating these bits thereby to form the packet. As is discussed in more detail below, the generation of the packets may include provision of reference data, for instance identifying the user equipment for which the user plane data is intended, a slot identifier, a symbol identifier and a sub frame identifier.

The fronthaul interface output processing stage 138 may also receive pre-configuration information and "a priori" information relating to processing to be performed by one or more L1 PHY processing stages downstream from the first L1 PHY processing stage. This received information may be additionally be used to generate the first and subsequent user plane data packets 401, 402.

The pre-configuration information may be received, for instance, from the system boot-up or from a man machine interface (MMI). It may include, for instance, all or any combination of one or more of the following:

information indicative of channel bandwidth which is to be utilised for transmission of the time slot-symbols in which the user plane data is carried;

information indicative of the duplexing scheme, such as time division duplexing or frequency division duplexing, which is to be utilised for transmission of the time slot-symbols in which the user plane data is carried;

information indicative of transport block size which is to be utilised for transmission of the time slot-symbols in which the user plane data is carried; and information indicative of cooperative features which are to be utilised for transmission of the time slot-symbols in which the user plane data is carried (such cooperative features may include, but are not limited to, carrier aggregation and coordinated multipoint).

The "a priori" information relating to processing to be performed by the one or more processing stages downstream from the first L1 PHY processing stage may, for instance, be received from those downstream processing stages beyond the fronthaul interface. It may be generated by centralised L1 PHY apparatus 13 based on information received from the packet scheduler. The "a priori" information may include all or any combination one or more of:

information indicative of the modulation scheme to be utilised for converting the transferred user plane data packets into corresponding modulation symbols (for instance, for 4G, it may identify one of QPSK, 16QAM, 64QAM, 256QAM; for 5G, it may identify a different modulation scheme);

information indicative of the scheme to be utilised for assigning the modulation symbols to one or more layers, which may depend on the specific transmission scheme being used;

information indicative of the scheme to be utilised for applying precoding to the modulation symbols in each layer and for mapping the pre-coded symbols to appropriate antenna ports; and information indicative of the scheme to be utilised for assigning the modulation symbols of the resource grid to be transmitted on each antenna port to specific resource elements (e.g. information on the specific subcarriers and symbols within the resource blocks).

As discussed previously, the recipient L1 PHY processing stage (which, in the example of FIG. 2, is the modulation stage 112) is configured such that it can perform its processing on a symbol-by-symbol basis. This is a re-engineering of the corresponding processing stage in legacy systems. In order to achieve this, the recipient L1 PHY processing stage may be provided with "a priori" knowledge of the physical resource block mapping which is to be utilised by the resource element mapping stage 115. Similarly to as discussed above, this a priori knowledge may be generated based on information received directly or indirectly from the packet scheduler 153.

Figure 3A:
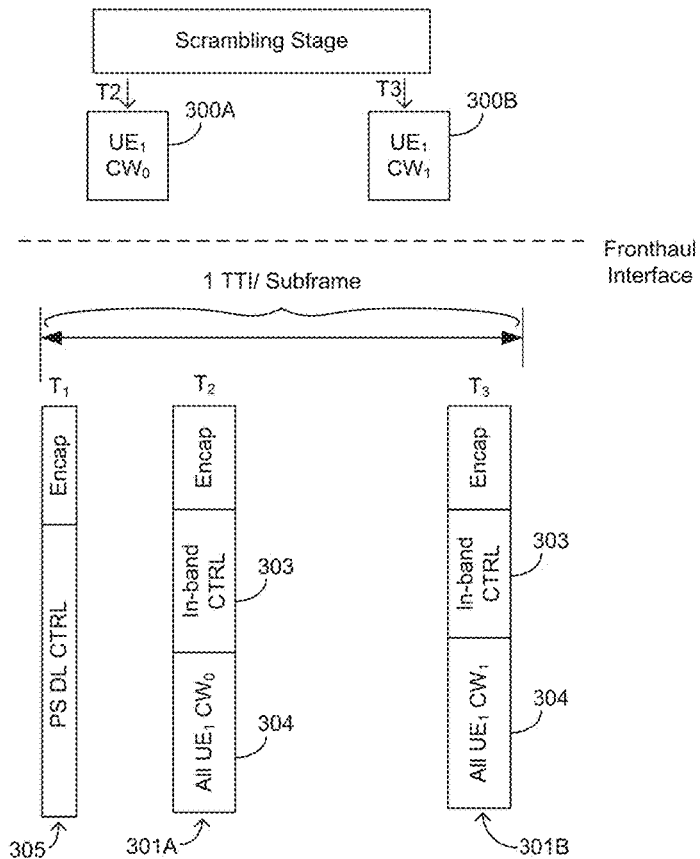
FIGS. 3A and 3B are schematic illustrations of packets passed downstream across a fronthaul interface according to a legacy "burst" method.
Figure 3B:
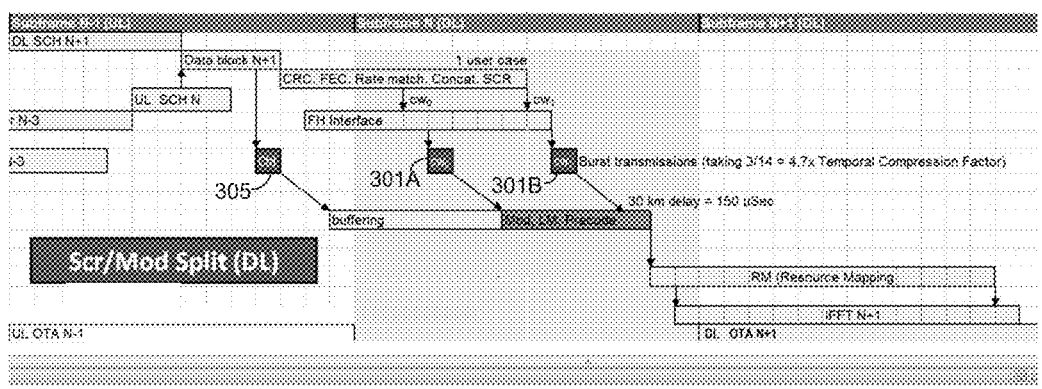

FIGS. 3A and 3B are schematic illustrations of packets being passed downstream across a fronthaul interface according to legacy methods. In this example, the split in the fronthaul interface is located in between the scrambling stage and the modulation stage.

As illustrated in FIG. 3A, one or more codewords 300A, 300B are output by the scrambling stage (for simplicity, only codewords relating to a particular UE ($UE_1$) are shown). These codewords include user plane data for transmission by the RRH to the particular UE. The scrambling stage may output maximum of two codewords per UE per TTI. In the legacy method, each codeword 300A, 300B is passed across the fronthaul interface 12 as one or more packets. In this example, each packet 301A, 301B includes all the bits of a respective codeword. However, in some instances, the codewords 300A, 300B may be fragmented into multiple packets for transfer across the interface, depending in their size.

In the legacy method, each packet 301A, 301B that is transferred across the interface 12 includes in-band control information 303, which is required by at least the recipient L1 PHY processing stage (in this example, the modulation stage) in order to process the received packets. Downlink packet scheduler control information, which carries data for transmission on the dedicated control channels is passed across the interface as separate control information packet 305 (one or more such packets may be transferred per TTI).

FIG. 3B shows an example data processing/transfer timing diagram according to the legacy data transfer approach.

As can be seen in FIG. 3B, a data transport block for a single user undergoes CRC/segmentation, FEC, rate matching, concatenation, and scrambling. Each scrambled codeword 305 is then packetized and passed over the fronthaul interface as soon as it is output by the scrambling stage. After modulation, the user plane data undergoes layer mapping, precoding, resource mapping, iFFT and finally downlink over the air transmission.

A separate control information packet 305 carrying the out-of-band control information carrying the downlink packet scheduler control information is passed across the interface as soon as it is generated and is buffered until the one or more packets 301 carrying the first codeword of user plane data are burst transferred across the interface. Once the data from the first codeword has been received by the modulation stage, modulation can begin.

Figure 4A:
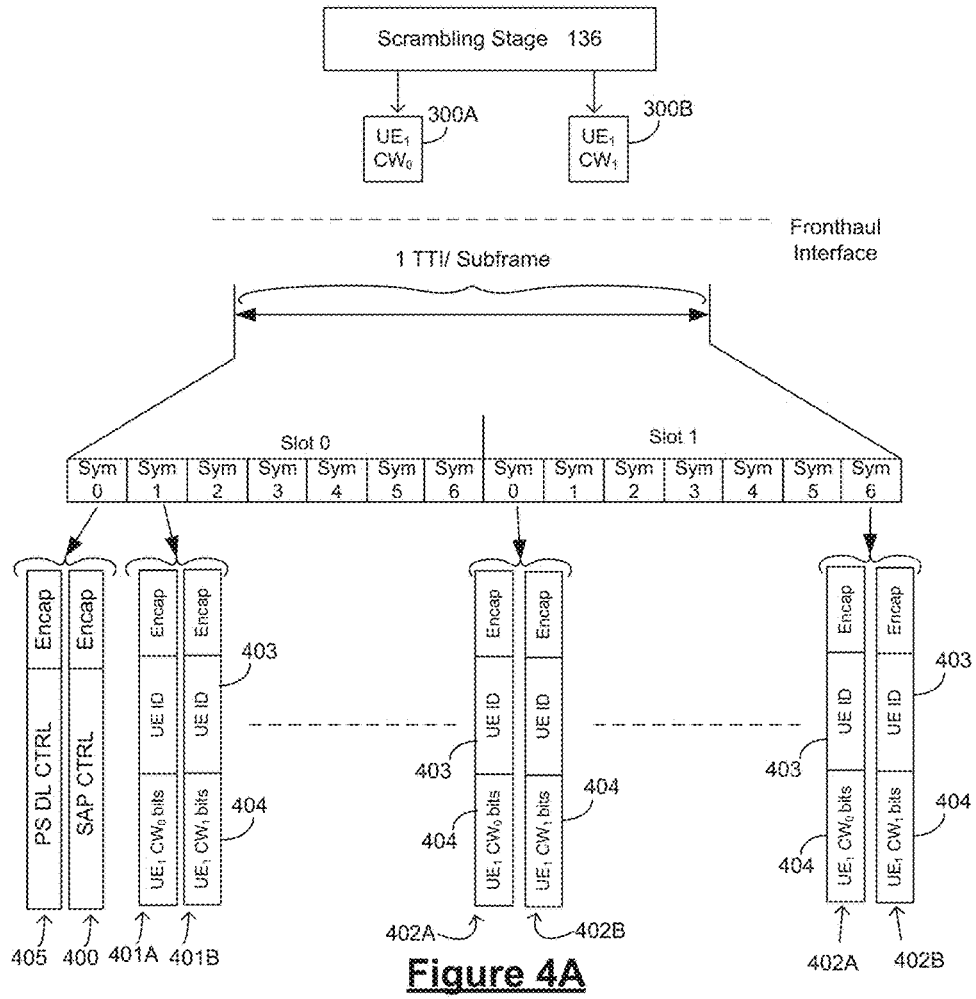
FIGS. 4A and 4B are schematic illustrations of the transfer of user plane data across the split fronthaul interface from the centralised L1 PHY processing apparatus to the remote L1 PHY processing apparatus on a "symbol-by-symbol" basis.
Figure 4B:
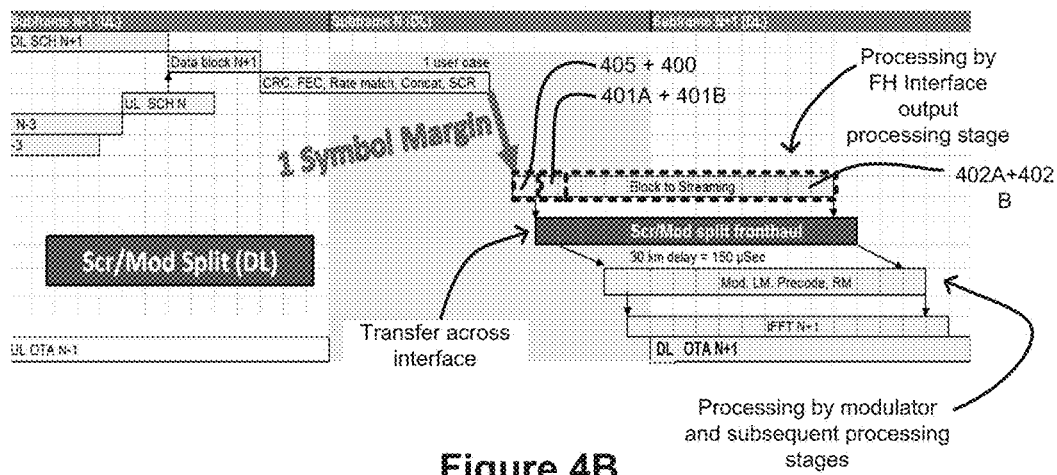

The legacy data transfer approach exemplified in FIGS. 3A and 3B can be compared with the symbol-by-symbol data transfer process described in general terms, a specific example of which is illustrated in FIGS. 4A and 4B.

In the example of FIGS. 4A and 4B, the division between the remote and centralised L1 PHY processing apparatus (i.e. the location of the fronthaul interface 12) is the same as that illustrated in FIG. 2. Again, for simplicity, FIGS. 4A and 4B both show only user plane data which is to be transmitted to a single UE.

As illustrated in FIG. 4A, the fronthaul interface output processing stage 138 receives from the scrambling stage 132 one or more codewords 300A, 300B containing user plane data for transmission to a single UE. As can be seen from FIG. 4B, instead of transferring the codewords across the interface in their entirety (or in fragmented packets, if necessitated by the codeword size) as soon as they are output by the scrambling stage (as is the case in the legacy system), the fronthaul interface output processing stage 138 waits to receive all codewords carrying user plane data which is to be transmitted in a particular TTI/subframe. After all codewords 300A, 300B (again, the maximum may be two per UE per TTI) have been output by the scrambling stage 136, the fronthaul interface output processing stage 138 begins processing the codewords and generating packets 401, 402 for transfer across the fronthaul interface 12 on a symbol-symbol basis. In particular, the fronthaul interface output processing stage 138 generates one or more user plane data plane packets 401, 402 for transfer across the fronthaul interface 12 in each of plural different successive time periods (for simplicity of the FIG. 4A, only 3 pairs of user plane data plane packets are shown). Each of the successive time periods (denoted Slot ½, Symbol 1, 2, 3 etc. in FIG. 4A) has a duration corresponding to the duration of a transmission time of a time-slot symbol (in which user plane data carried in the packet(s) is to be transmitted to the UE). As will be appreciated from the above discussion, the order of the time periods in which the packets are transferred across the interface corresponds to the order in which the time-slot symbols including data from the packets are to be transmitted to UE.

In the example of FIG. 4A, a pair of "first user plane data plane packets" 401A, 401B is transferred across the fronthaul interface 12 in the first time period (denoted Slot 0, Sym 1). In this example, each packet 401A, 401B of the pair contains a subset of the bits of user plane data from a different codeword.

Subsequently, pairs of subsequent user plane data plane packets 402A, 402A are transferred across the interface each in each of successive subsequent time periods (e.g. those denoted by Slot 0, Sym 2, 3, 4 etc.). Although only two pairs of subsequent user plane data plane packets 402A, 402B are shown in FIG. 4A, it is clear from FIG. 4B that subsequent data plane packets are transferred in each of a successive sequence of time periods. As with the pairs of first user plane data plane packets 401, in the Example of FIG. 4A, each packet of the pairs of subsequent user plane data plane packets 402 includes subsets of the bits of user plane data from a different codeword.

Typically, the subset of user plane data carried in a first/subsequent user plane data packet 401 may be for transmission to only a single UE. However, in some instances, user plane data for multiple users (e.g. multiple, or even all, of the code blocks for different users shown in the column marked slot 0, symbol 1 in FIG. 6) may be aggregated into a single packet. Such aggregation of user plane data for multiple users may occur, for instance but not exclusively, when the data is to be transmitted to an intermediary device, which will then distribute the user plane data to separate UEs (for instance, a UE integrated with a vehicle may distribute data to separate UEs travelling within the vehicle). Similarly, each of at least two first/subsequent user plane data packets 401A, 401B, 402A, 402B transferred across the interface in a particular time period may carry user plane data intended for transmission to different end user equipments.

The example illustrated in FIGS. 4A and 4B is one in which the SAP control information is sent across the fronthaul interface 12 in a control information packet 400 in a time period (denoted Slot 0, Sym 1) prior to that in which the first user plane data packet 401 is passed across the interface. Consequently, in this example, each of the user plane data packets includes information 403 (referred to as UE ID) which identifies the SAP control information which relates to the user plane data packet. In the example of FIG. 4A, the control information packet 400 is transferred across the interface in a time period with the control information packet 405 which carries dedicated control channel data.

As can be seen from FIG. 4B, by transferring the user plane data across the interface on a symbol-by-symbol basis an extra symbol margin for the end-to-end latency may be provided (in comparison to the legacy case illustrated in FIG. 3B). This, coupled with the lowered bandwidth requirement on the fronthaul interface 12 may serve to provide a more efficient mode of fronthaul transport.

Figure 5:
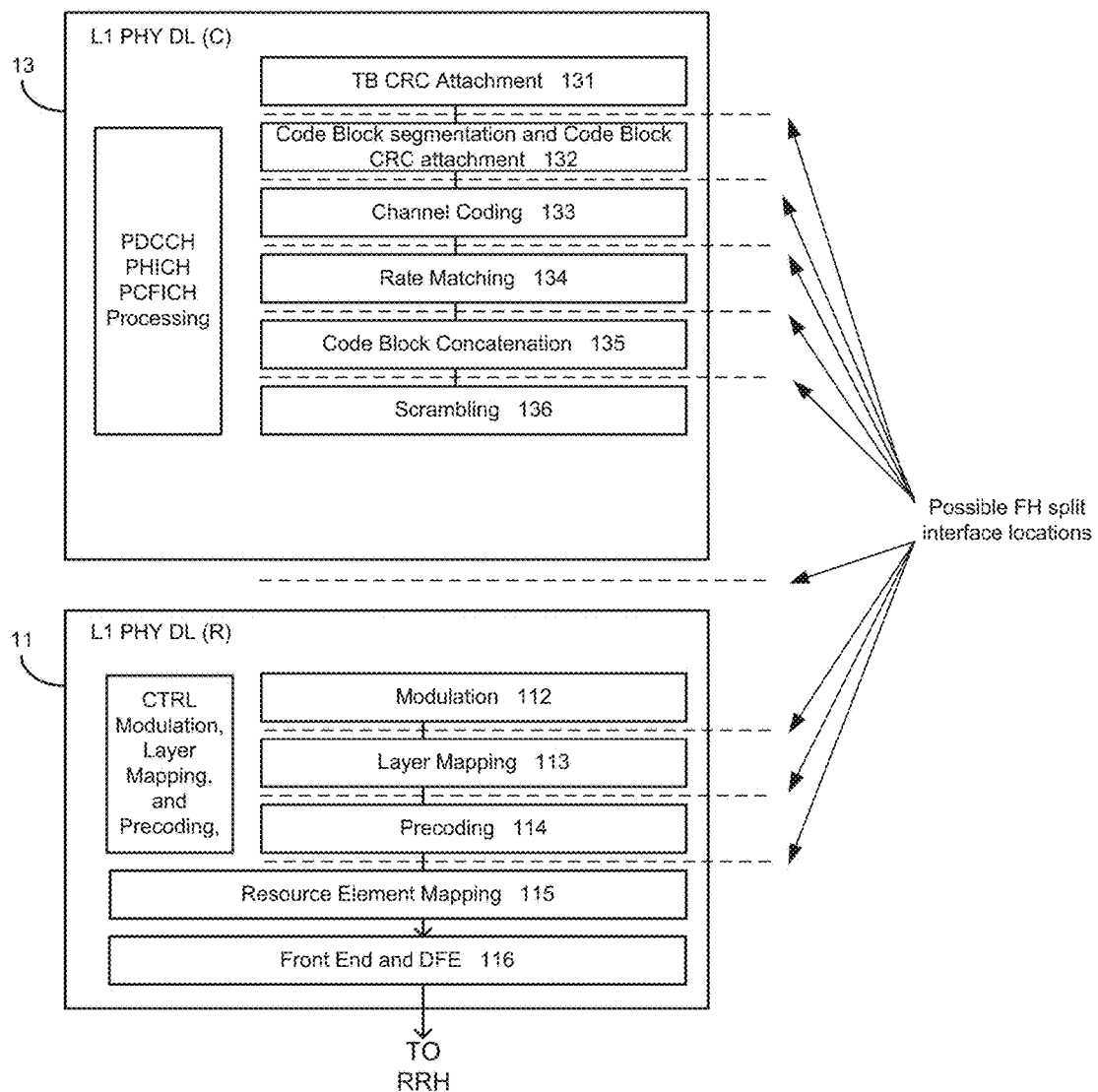
FIG. 5 illustrates various other examples of divisions of L1 PHY processing stages between the remote and centralised L1 PHY processing apparatuses.
Figure 6:
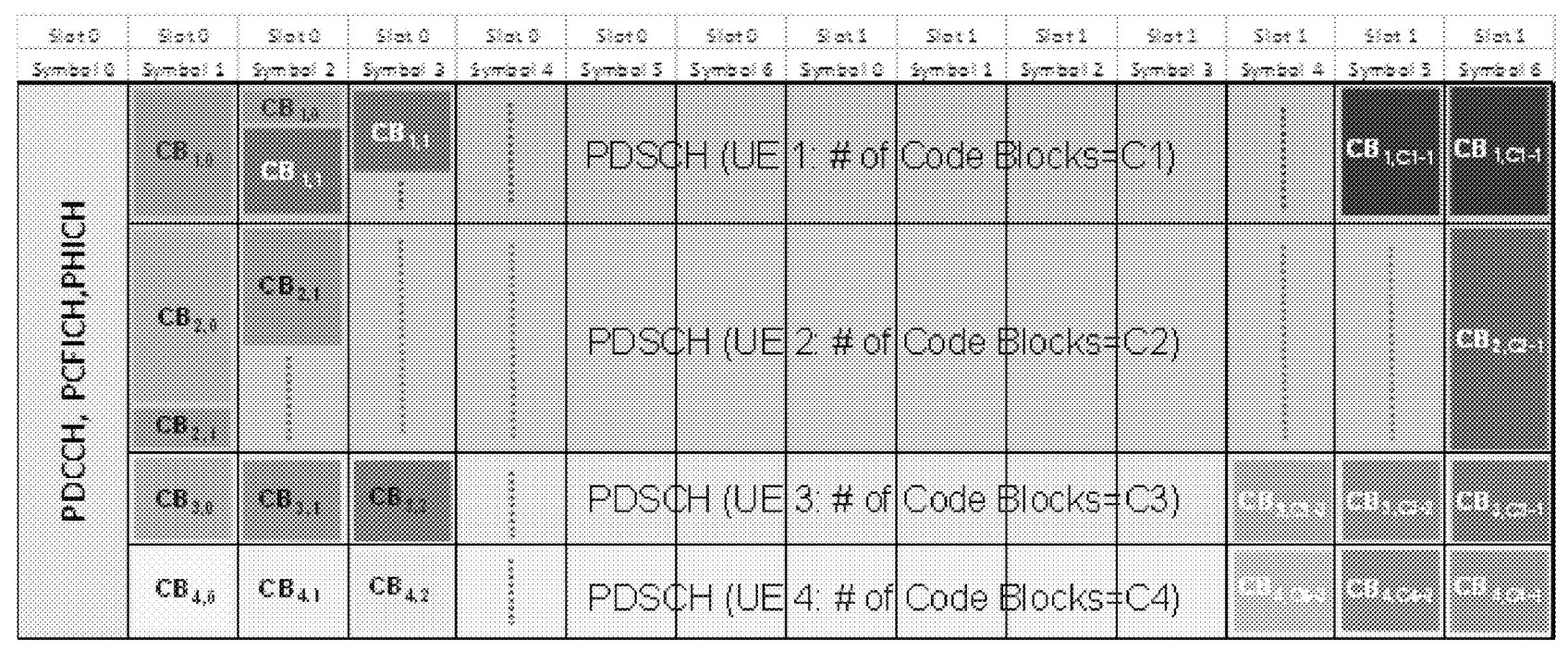

As mentioned previously, the symbol-by-symbol transfer of data is not limited to a fronthaul interface located between the scrambling and modulation stages (as shown in FIG. 2). Instead, it may equally be applied when the interface is at other locations. FIG. 5 shows the various locations at which the fronthaul interface may be provided and with which symbol-by-symbol data transfer may be utilised. Indeed, as illustrated in FIG. 6, it may occur between any of the L1 PHY processing stages.

The implementation of the interface between the scrambling stage and modulation stage (as in FIG. 2) or any subsequent downstream location (e.g. for instance between the layer mapping stage and the precoding stage) may be relatively straightforward. This is because the functional processing by the processing stages surrounding the interface is based on a small number of bits at a time, with the number of bits being substantially less than the number of bits in a time slot symbol. In addition, each processing operation on each bit or group of bits is "independent" of the processing performed on earlier or later bits or groups of bits. For instance, the functional processing performed by the scrambling stage is on a single bit level, with the processing by downstream stages increasing to modulated symbol level (for processing performed by the modulation processing stage) and to 8× modulated symbol level basis (for the layer mapping). In both of these cases (modulation and layer mapping), each modulated symbol is independent.

Because the processing performed by these downstream processing stages is independent of earlier or later processing, there is no processing inefficiency resulting from non-uniform processing from one symbol to the next. The processing rate is, therefore, is largely uniform. In addition, there is no granularity issue with regard to the transport; it is possible send exactly (or nearly) the number of bits needed for downstream processing of a time-slot symbol.

The processing prior to the modulation stage is all "bit level" processing. However, for some processing prior to the modulation stage, the bits are not independent of one another. For instance, in the encoder, the processing is clearly not bit-level independent. Instead, bits are interdependent because that is the nature of "coding".

The channel coding stage 133 provides a "code block" of data, which might be a significant part of the data carried by a time-slot symbol or perhaps, in some instances, a little more than a time-slot symbol. In view of this, in some examples in which the interface 12 is located immediately after the channel coding stage 133, the channel coding stage 133 may be caused to stop generation of a code block after the bits required for a particular time-slot symbol have been generated. However, in view of the "time zero" nature of the channel coding stage 133, the states in the channel coding stage may be saved so that it can be restarted for generation of the subsequent bits.

Alternatively, the channel coding stage 133 may be caused to temporarily stop encoding at code block boundaries (in view of the fact that multiple code blocks are concatenated to make a codeword). A portion of the code block will be transmitted as a first time-slot symbol may then be transferred across the interface 12, with the remaining data in the generated code blocks being saved for subsequent transfer across the interface.

FIG. 6 illustrates an example of the mapping of coded bits to time-slot symbol time periods. As can be seen, code block $CB_{1,0}$ is an example of a code block which is larger than can be contained in a single time-slot symbol's worth of time. Code blocks $CB_{3,0}$ and $CB_{4,0}$ on the other hand are are contained fully within a time-slot symbol duration.

Both of these methods (stopping at the code block boundary or temporarily stopping the channel coding stage) provide efficient transfer of data across the fronthaul interface, but may result in more variation or complexity in the functional processing by the channel coding stage. That is, processing will not be uniform or constant from one time-slot symbol to the next. For 5G, however, this processing variation efficiency may be eliminated. This is because low-density parity-check coding (as opposed to the 4G-based turbo encoding), which may be used in 5G is more efficient and uses smaller code blocks than does the turbo encoding of 4G. Because latency is a key concern with regard to 5G, code blocks could be sized in a manner that exactly aligns to time-slot symbol boundaries on a user by user basis. Put another way, each code block may include an amount of user plane data that is less than or equal to an amount of data that can be carried in a payload of a packet transmitted as a single time-slot symbol. In this manner, both transport and processing efficiency (minimized symbol by symbol variation) may be achieved.

Figures 7A, 7B:
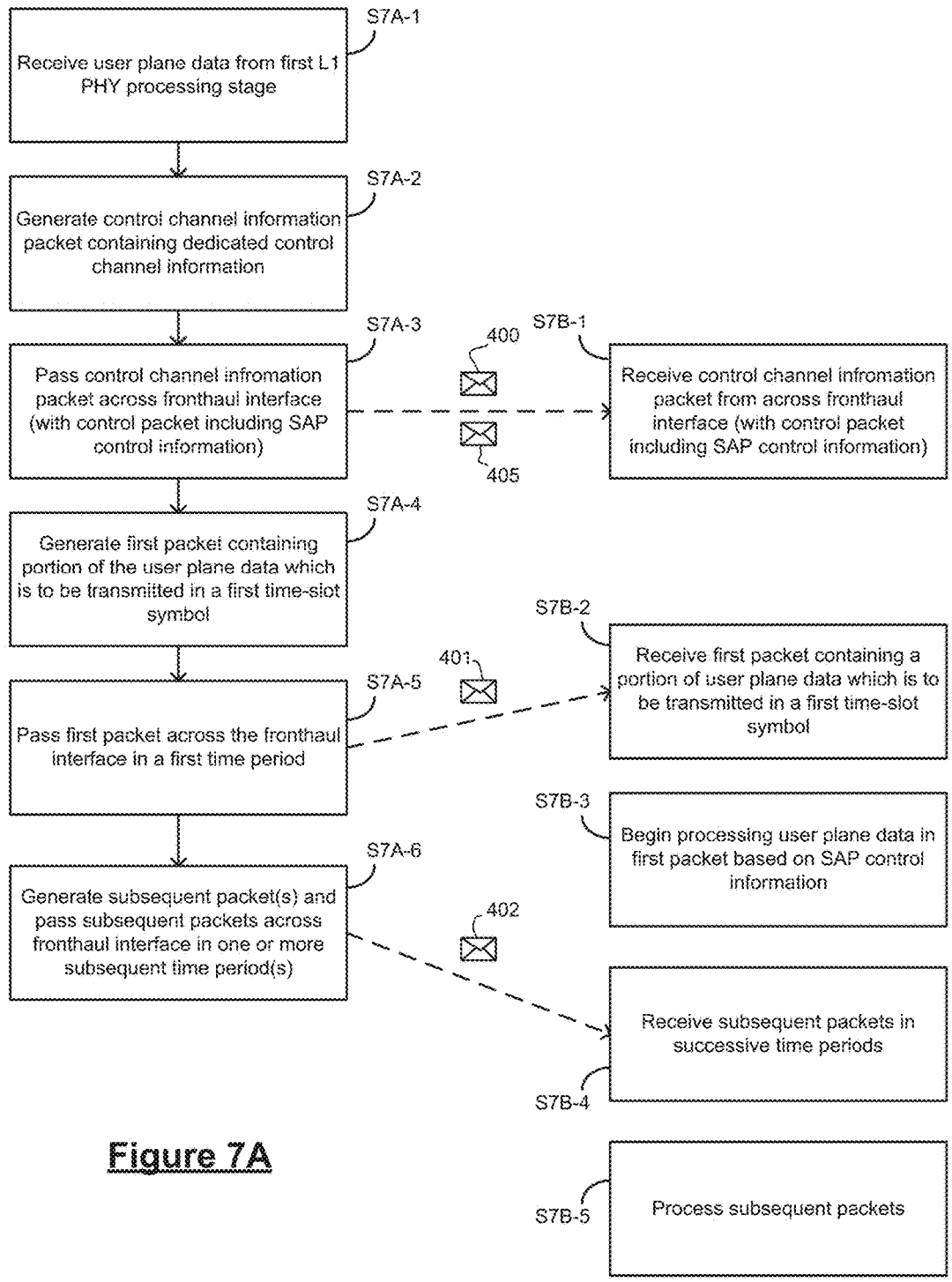
FIGS. 7A and 7B are flow charts illustrating various operations which may be performed at the centralized L1 PHY processing apparatus and the remote L1 PHY apparatus respectively.

FIGS. 7A and 7B are flow charts illustrating various operations which may be performed by the centralised and remote L1 PHY processing apparatuses 11, 13. In particular, the FIG. 7A shows operations which may be performed by the centralised L1 PHY processing apparatuses 13, in particular the fronthaul interface output processing stage 138. FIG. 7B shows operations which may be performed by the L1 PHY processing stage which is immediately downstream of the fronthaul interface 12 (which, in the example of FIG. 2 is the modulation stage 112).

In operation S7A-1 of FIG. 7A, the fronthaul interface output processing stage 138 receives user plane data 300A, 300B (generally referenced 300) which is output from a first L1 PHY processing stage (i.e. the stage which immediately precedes the fronthaul interface output processing stage 138) and which is for transmission within a single transmission time interval. The format of the user plane data 300 depends on the nature of the first L1 PHY processing stage. For instance, if the first L1 PHY processing stage is the scrambling stage (as is the case in FIG. 2), the user plane data 300 may be in the form of one or more codewords.

In operation S7A-2, the fronthaul interface output processing stage 138 generates a control channel information packet containing dedicated control channel information which is to be transmitted to UEs being served by the eNB 7 on one or more dedicated control channels (e.g. PDCCH, PHICH, PCFICH).

In operation S7A-3, the control channel information packet 405 is sent across the fronthaul interface 12 in an initial time period having a duration corresponding to a duration of transmission of a time-slot symbol (e.g. slot 0, sym 0) in which the dedicated control information is to be transmitted to the UEs.

In some examples, the control channel information packet 405 is transferred across the split fronthaul interface in the same time period as a SAP control information packet 400. The SAP control information packet 400 may contain control information for enabling the L1 PHY processing stages on the remote side of the fronthaul interface 12 to continue processing the transferred data on a symbol-by-symbol basis. The SAP control information packet 400 may have been generated by the fronthaul interface output processing stage 138 on the basis of information received from the packet scheduler 153.

In operation S7A-4, the fronthaul interface output processing stage 138 generates a first user plane data packet 401 including a portion of the received user plane data that is to be transmitted to a particular UE during a first time-slot symbol (e.g. slot 0, sym 1). In some examples, two or more first user plane data packets 401A, 401B may be generated. Each packet of the two or more packets may 401A, 401B may, for instance, include data bits derived from different codewords output by the scrambling stage 136.

In operation S7A-5, the first user plane data packet 401 (or pair of packets 401A, 401B) is sent to the remote L1 PHY processing apparatus 11 via the split fronthaul interface during a time period having a duration corresponding to a duration of transmission of a time-slot symbol. The time period in which the first user plane data packet(s) 401 is/are sent to the remote L1 PHY processing apparatus 11 may be immediately subsequent to the initial time period during which the control channel information packet 405 (and, in some examples, also the SAP control information packet 40) is sent to the remote L1 PHY processing apparatus 11.

In some examples, the first user plane data packet(s) 401 may also include SAP control information for enabling the remote L1 PHY processing stages to process at least the user plane data included in the first user plane data packet(s). In other examples in which the SAP control information is sent as a separate packet 405 (i.e. out of band with the user plane data) the first user plane data packet(s) 401 may include information 403 which indicates the portion of the SAP control information which should be used for processing the user plane data included in the user plane data packet(s). This information may include, for instance (see FIG. 8B), a UE identifier, a symbol ID, a slot ID and a codeword ID.

In operation S7A-6, the fronthaul interface output processing stage 138 generates one or more subsequent user plane data packets from the received user plane data. These packets are then sent to the remote L1 PHY processing apparatus 11 during one or more subsequent and successive time periods. The one or more subsequent user plane data packets may be generated based on the same information to that used for generation of the first user plane data packet(s). As with the time periods in which control channel packet 400 and the first user plane data packet(s) 401 are sent, the time periods in which the subsequent user plane data packets 402 are sent across the interface have a duration corresponding to a duration transmission of the time-slot symbols via which the user plane data of those packets will be sent to the UE. In some examples, for instance when the user plane data arrives in two separate codewords, a pair of subsequent packets 402A, 402B may be sent to the remote L1 PHY processing apparatus 11 during a single subsequent time period.

Referring now to FIG. 7B, in operation 7B-1, the initial L1 PHY processing stage in the remote L1 PHY processing apparatus may receive the control channel information packet 405 from the centralised L1 PHY processing apparatus 13 via the fronthaul interface. The control channel information packet 405 is received in time period which corresponds to transmission time of a time-slot symbol in which the control channel information carried in the control channel information packet 405 is to be transmitted. In some examples, the SAP control information packet 400 may be received in the same time period as the control channel information packet 405.

As will be appreciated, due to the distance between the centralised L1 PHY processing apparatus and the remote L1 PHY apparatus 11, there is a delay between the packets being transferred from the centralised L1 PHY processing apparatus 13 and being received at the remote L1 PHY processing apparatus 11. For instance, as illustrated in FIG. 4B, if the distance between the remote and centralised L1 PHY apparatuses 11, 13 is 30 km, the time delay may be approximately 150 microseconds (which may be equivalent to duration of three time-slot symbols).

Subsequently, in operation S7B-2, the first user plane data packet 401 (or pair of first user plane data packets) is received via the fronthaul interface. This packet is received in a time period that corresponds to transmission time of a time-slot symbol in which the portion of the user plane data carried in the first user plane data packet(s) 401 is to be transmitted. In some examples, the time period in which the first user plane data packet(s) 401 is received may be immediately subsequent to that in which the control channel information packet 405 (and in some instances also the SAP control information packet 400) is received.

Following receipt of the first user plane data packet(s) 401, the initial L1 PHY processing stage in the remote L1 PHY processing apparatus, in operation S7B-3 begins processing the user plane data in the first user plane data packet(s). The processing is performed using the SAP control information for that packet (which is either transferred prior to the first user plane data packet(s) 401 or forms part of the first user plane data packet(s).

Once processed, the processed user plane data is passed to the subsequent L1 PHY processing stage, which in the example of FIG. 2 is the layer mapping stage 113.

In operation S7B-4, the one or more subsequent user plane data packets 402 are received via the fronthaul interface. These may be received in successive time periods which are immediately subsequent to the time period in which the first data packet(s) are received. As mentioned above, in some examples, a pair of subsequent packets may be received in each time period. Also, each subsequent time period may have a duration corresponding to a duration in which a time slot symbol carrying the user plane data (received during the subsequent time period) will be transmitted.

In operation S7B-5, the subsequent user plane data packets received in each subsequent time period are processed by the initial L1 PHY processing stage in the remote L1 PHY processing apparatus 11. The processing of each packet (or pair of packets) may be performed as the next subsequent packet (or pair of packets) is being received. Again, the processing may be based on the SAP control information. Once processed, the processed user plane data is passed to the subsequent L1 PHY processing stage (which in the example of FIG. 2 is the layer mapping stage 113).

Figure 8A:
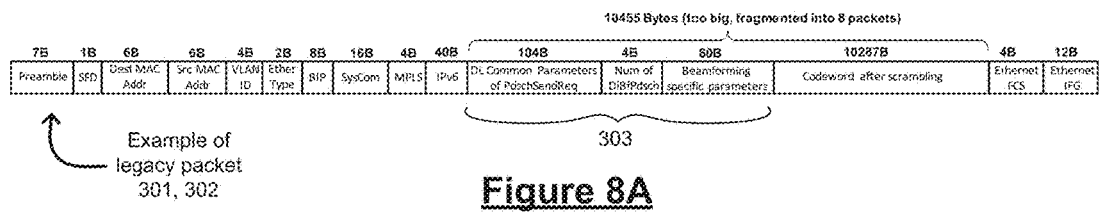
FIGS. 8A to 8C illustrate the substantially constant fronthaul interface data transfer rate that may be achieved by transferring user plane data on a symbol-by-symbol basis.
Figure 8B:
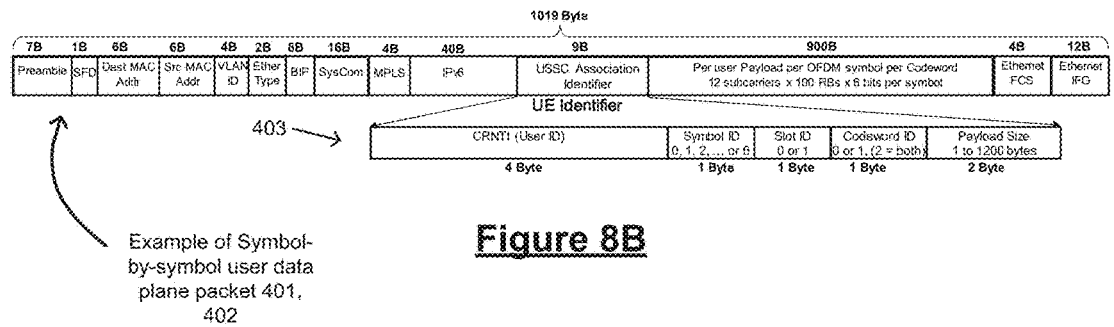
Figure 8C:
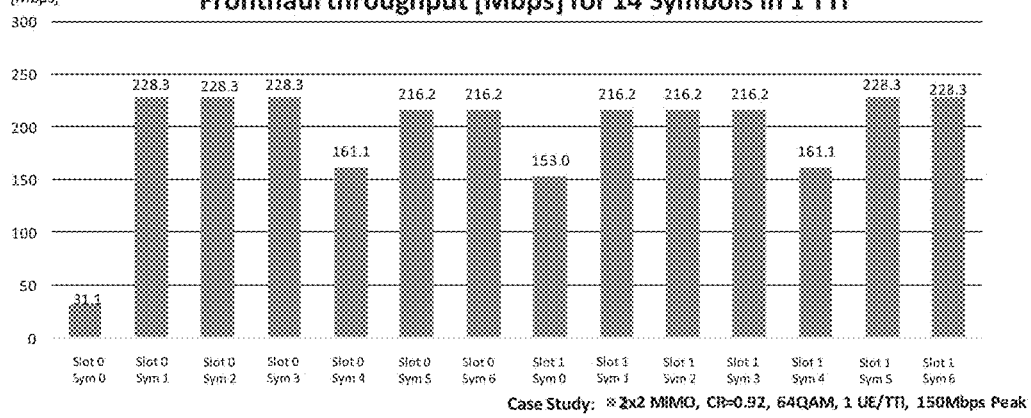

FIGS. 8A to 8C will now be used to explain quantitatively various benefits which may be obtained by employing a symbol-by-symbol transfer of user plane data across the fronthaul interface such as described with reference to FIGS. 1, 2, 4A, 4B, 7A and 7B.

FIG. 8A illustrates an example composition of a burst containing user plane data for a single user which may be transferred across the fronthaul interface using the legacy burst method, for instance as illustrated in FIGS. 3A and 3B. In particular, FIG. 8A illustrates the packet composition in an example system with the following operating parameters: 2×2 MIMO, High Code Rate (CR=0.92), 64 QAM single UE per TTI.

In the example of FIG. 8A, the scrambled codeword size is 10287 bytes, which results in a fronthaul throughput of 11335 bytes or 90680 bits (10455 Bytes+8 encapsulation overhead (=110 bytes)). If this is transmitted during a duration equivalent to one time-slot symbol, the throughput is equal to 1270 Mbps.

FIG. 8B illustrates an example composition of a packet of user plane data (e.g. the first packet 401 or a subsequent packet 402) which is transferred across the fronthaul interface 12 in the symbol-by-symbol manner described with reference to FIGS. 1, 2, 4A, 4B, 6A and 6B.

With the same operating parameters (i.e. 2×2 MIMO, High Code Rate (CR=0.92), 64 QAM single UE per TTI), the maximum throughput across the interface on a symbol by symbol basis as described herein may be approximately 230 Mbps (this assumes that two packets are transferred per symbol and that the payload of each packet is 900 bytes (=12 subcarriers×100 resource blocks×6/8 bits per symbol×1 codeword)). Thus, the symbol-by-symbol transfer may provide nearly a five times reduction in required fronthaul interface bandwidth compared with that of the legacy method.

FIG. 8C shows the fronthaul throughput of user plane data for one TTI for all 14 time-slot symbols for a system employing symbol-by-symbol interface transfer which utilises the same operating parameters as described with reference to FIG. 8B. As can be seen, except for the time period (denoted Slot 0, Sym 0), which is used to send the control information packets 400, 405, for all subsequent time periods the fronthaul throughput is near-constant (and certainly far closer to constant than the legacy method which may have two or more slots with a very high throughput, with the remaining slots being unused). In the illustrated example, throughput of user plane data is slightly lower in some time periods because the data transferred in those period carry extra "signalling" overhead, which may include one or more of physical broadcast channel (PBCH) signalling, primary synchronisation signals (PSS), secondary synchronisation signals (SSS), and pilot tones.

Figure 9:
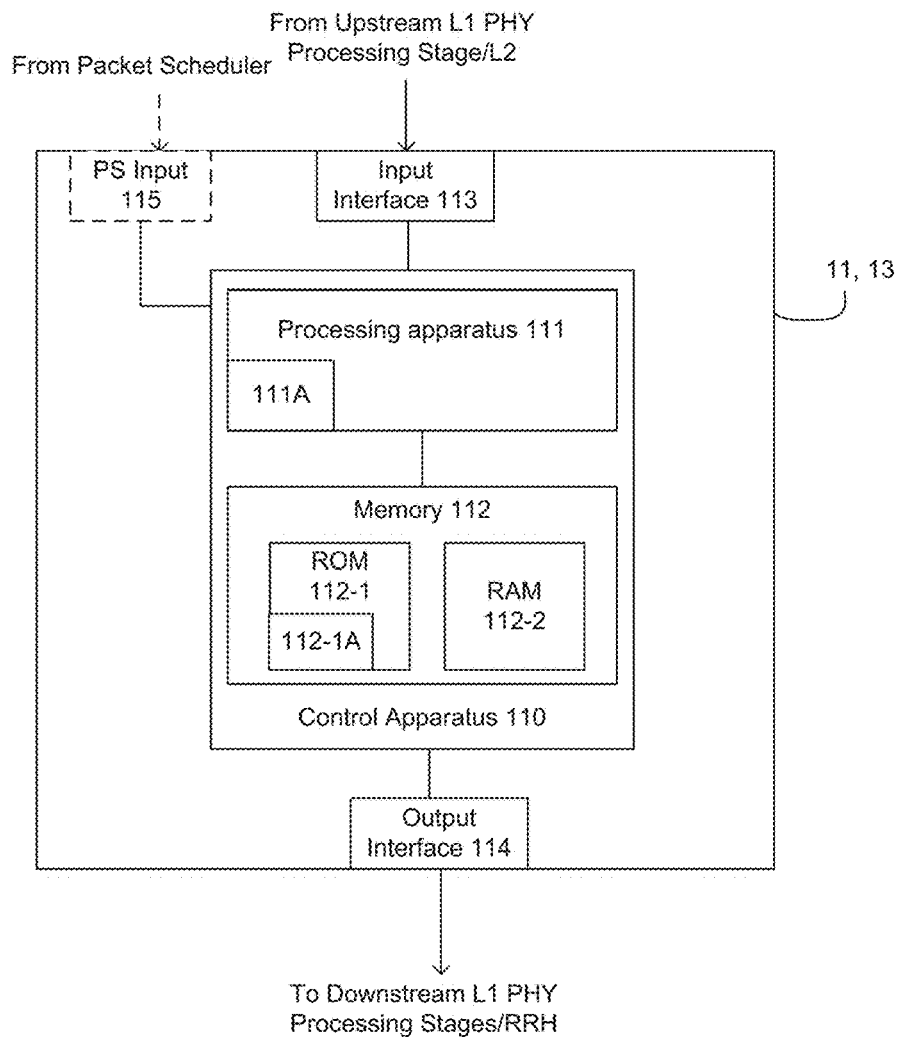
FIG. 9 is a schematic illustration of an example hardware configuration which may make up the remote and centralised L1 PHY processing apparatuses.

FIG. 9 is an example configuration of apparatus which may make up either of the remote and centralised L1 PHY apparatuses 11, 13.

The apparatus 11, 13 comprises control apparatus 110 which may provide the functions of each of the L1 PHY processing stages assigned to the remote or centralised L1 PHY apparatuses 11, 13, depending on the location of the split fronthaul interface 12.

The apparatus 11, 13 additionally comprises an input interface 113 via which data is received at the apparatus 11, 13 (from an L2 processing stage, when the apparatus 11, 13 is the centralised L1 PHY processing apparatus 13, and from an upstream L1 PHY processing stage when the apparatus 11, 13 is the remote L1 PHY processing apparatus 13). The apparatus 11, 13 further comprises an output interface 114 for transferring data out of the apparatus 11, 13 (to the remote L1 PHY processing apparatus 13 when the apparatus is the centralised L1 PHY processing apparatus 11, and to the RRH 10 when the apparatus is the remote L1 PHY processing apparatus 11). The input and output interfaces 113, 114, which may in fact be bi-directional interface, may be in the form of wired interfaces, such as but not limited to Ethernet interfaces.

When the apparatus 11, 13 is the centralised L1 PHY processing apparatus 13, the apparatus may further comprise a dedicated packet scheduler interface for receiving data from the packet scheduler 115.

As will of course be appreciated, the apparatus 11, 13 may include various other components which aren't illustrated in FIG. 9.

The control apparatus 110 may comprise processing apparatus 111 communicatively coupled with memory 112. The memory 112 has computer readable instructions 112-1A stored thereon, which when executed by the processing apparatus 111 causes the control apparatus 110 to cause performance of various ones of the operations described with reference to FIGS. 1 to 7B. The control apparatus 110 may in some instance be referred to, in general terms, as "apparatus".

The processing apparatus 111 may be of any suitable composition and may include processor circuitry 111A of any suitable type or suitable combination of types. Indeed, the term "processing apparatus" should be understood to encompass computers having differing architectures such as single/multi-processor architectures and sequencers/parallel architectures. For example, the processing apparatus 111 may be programmable processor circuitry that interprets computer program instructions 112-1A and processes data. The processing apparatus 111 may include plural programmable processors. Alternatively, the processing apparatus 111 may be, for example, programmable hardware with embedded firmware. The processing apparatus 111 may alternatively or additionally include one or more specialised circuit such as field programmable gate arrays FPGA, Application Specific Integrated Circuits (ASICs), signal processing devices etc. In some instances, processing apparatus 111 may be referred to as computing apparatus or processing means.

The processing apparatus 111 is coupled to the memory 112 and is operable to read/write data to/from the memory 112. The memory 112 may comprise a single memory unit or a plurality of memory units, upon which the computer readable instructions (or code) 112-1A is stored. For example, the memory 112 may comprise both non-volatile memory 112-1 and volatile memory 112-2. In such examples, the computer readable instructions/program code 112-1A may be stored in the non-volatile memory 112-1 and may be executed by the processing apparatus 111 using the volatile memory 112-2 for temporary storage of data or data and instructions.

Examples of volatile memory include RAM, DRAM, and SDRAM etc. Examples of non-volatile memory include ROM, PROM, EEPROM, flash memory, optical storage, magnetic storage, etc.

The memory 112 may be referred to as one or more non-transitory computer readable memory medium or one or more storage devices. Further, the term 'memory', in addition to covering memory comprising both one or more non-volatile memory and one or more volatile memory, may also cover one or more volatile memories only, one or more non-volatile memories only. In the context of this document, a "memory" or "computer-readable medium" may be any media or means that can contain, store, communicate, propagate or transport the instructions for use by or in connection with an instruction execution system, apparatus, or device, such as a computer.

Figure 10:
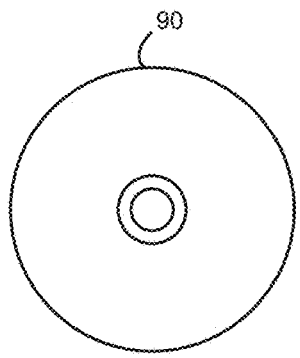
FIG. 10 is an illustration of a computer readable medium on which computer-readable instructions may be stored.

The computer readable instructions/program code 112-1A may be pre-programmed into the control apparatus 110. Alternatively, the computer readable instructions 112-1A may arrive at the control apparatus via an electromagnetic carrier signal or may be copied from a physical entity 90 such as a computer program product, a memory device or a record medium such as a CD-ROM or DVD an example of which is illustrated in FIG. 10. The computer readable instructions 112-1A may provide the logic and routines that enables the apparatuses 11, 13 to perform the functionality described above. The combination of computer-readable instructions stored on memory (of any of the types described above) may be referred to as a computer program product. In general, references to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term 'circuitry' refers to all of the following: (a) hardware-only circuit implementations (such as implementations in only analogue and/or digital circuitry) and (b) to combinations of circuits and software (and/or firmware), such as (i) to a combination of processor (s) or (ii) to portions of processor(s)/software (including digital signal processor(s)), software, and memory(ies) that work together to cause an apparatus, such as a eNB (or components thereof), to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined.

Although the method and apparatus have been described in connection with a 4G or 5G network, it will be appreciated that they are not limited to such networks and are applicable to radio networks of various different types.

Although various aspects of the methods, apparatuses described herein are set out in the independent claims, other aspects may comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. Apparatus comprising:
   at least one processor; and
   at least one memory including computer program code which, when executed by the at least one processor, causes the apparatus:
      to generate a first packet based on user plane data relating to one or more user equipment which is output by a first L1 PHY processing stage, the first packet including a proper subset of the user plane data which is to be transmitted over-the-air from a remote radio head to the one or more user equipment during a first time-slot symbol;
      to pass the first packet to a second L1 PHY processing stage across a split fronthaul interface in a first time period having a duration corresponding to a duration of transmission of the first time-slot symbol; and
      to pass one or more subsequent packets including the remainder of the user plane data across the split fronthaul interface in one or more successive time periods which are immediately subsequent to the first time period.

2. The apparatus of claim 1, wherein the computer program code, when executed by the at least one processor, causes the apparatus:
   to pass control information across the split fronthaul interface at the latest during the first time period, the control information being for enabling the second processing stage to begin processing the subset of user plane data prior to receipt of the one or more subsequent packets.

3. The apparatus of claim 2, wherein the computer program code, when executed by the at least one processor, causes the apparatus to pass the control information across the interface as a separate packet prior to the first time period.

4. The apparatus of claim 2, wherein the computer program code, when executed by the at least one processor, causes the apparatus to include the control information in the first packet with the proper subset of user plane data.

5. The apparatus of claim 3, wherein the control information enables the second processing stage to process the first packet and the one or more subsequent packets.

6. The apparatus of claim 5, wherein the computer program code, when executed by the at least one processor, causes the apparatus to include in the first packet and/or the subsequent packets information which identifies the user equipment to which the user plane data carried in the packet is to be transmitted.

7. The apparatus of claim 3, wherein the computer program code, when executed by the at least one processor, causes the apparatus to pass the separate packet including the control information across the interface in a time period that is prior to the first time period along with another packet including L2 packet scheduler downlink control information.

8. The apparatus of claim 1, wherein the user plane data is output by the first L1 PHY processing stage as one or more codewords and wherein the first L1 PHY processing stage is a scrambling stage and the second L1 PHY processing stage is a modulation stage.

9. The apparatus of claim 1, wherein the first L1 PHY processing stage is downstream from a scrambling stage or wherein the first L1 PHY processing stage is upstream from a scrambling stage.

10. The apparatus of claim 1, wherein the user plane data output by the first L1 PHY processing stage is in the form of multiple code blocks and wherein each code block includes an amount of user plane data that is less than or equal to an amount of data that can be carried in a payload of a packet transmitted as a single time-slot symbol.

11. The apparatus of claim 1, wherein the computer program code, when executed by the at least one processor, causes the apparatus to generate the first packet using information received from an L2 packet scheduler.

12. The apparatus of claim 11, wherein the information received from the L2 packet scheduler includes all or any combination of:
   information indicative of a number of user equipments, UEs, allocated to a transmission time interval, TTI, during which the time-slot symbols carrying the user plane data are to be transmitted to a UE;
   information indicative of a modulation and coding scheme allocated for each of the UEs allocated to the TTI;
   information indicative of a multiple-input-multiple output, MIMO, scheme or a transmission diversity scheme employed for transmission of the time-slot symbols carrying the user plane data;
   information indicative of resource block allocation for each UE;
   information indicative of beamforming specific parameters employed for transmission of the time-slot symbols carrying the user plane data; and
   information indicative of a number of time-slot symbols that are reserved for a physical downlink control channel, PDCCH.

13. The apparatus of claim 1, wherein the computer program code, when executed by the at least one processor, causes the apparatus to generate the first packet based on pre-configuration information.

14. The apparatus of claim 13, wherein the pre-configuration information includes all or any combination of:
   information indicative of channel bandwidth for transmission of the time-slot symbols carrying the user plane data;
   information indicative of a duplexing scheme for transmission of the time-slot symbols carrying the user plane data;
   information indicative of available transport block sizes for transmission of the time-slot symbols carrying the user plane data; and
   information indicative of cooperative features for transmission of the time-slot symbols carrying the user plane data.

15. The apparatus of claim 1, wherein the computer program code, when executed by the at least one processor, causes the apparatus to generate the first packet based on information relating to processing by one or more L1 PHY processing stages downstream from the first L1 PHY processing stage.

16. The apparatus of claim 15, wherein the information relating to processing by one or more L1 PHY processing stages downstream from the first processing stage includes all or any combination of:
   information indicative of a modulation scheme for converting the packets into corresponding modulation symbols;

information indicative of a scheme for assigning the modulation symbols to one or more layers;

information indicative of a scheme for applying precoding to the modulation symbols in each layer and for mapping the pre-coded symbols to appropriate antenna ports; and information indicative of a scheme for assigning the modulation symbols on a resource grid to be transmitted on each antenna port to specific resource elements.

17. Apparatus comprising:

at least one processor; and at least one memory including computer program code which, when executed by the at least one processor, causes the apparatus:

to receive, at a second L1 PHY processing stage from across a split fronthaul interface, a first packet including a proper subset of user plane data output by a first L1 PHY processing stage which is upstream of the split fronthaul interface, wherein the user plane data relates to one or more user equipment and wherein the proper subset of the user plane data is to be transmitted over-the-air from a remote radio head to at least one of the one or more user equipment as a first time-slot symbol, wherein the first packet is received in a first time period having a duration corresponding to a duration of transmission of the first time-slot symbol;

to begin processing of the first data packet prior to expiry of a second time period that is immediately subsequent to the first time period and which has a duration corresponding to a duration of transmission of a second time-slot symbol; and to receive one or more subsequent packets, which together include the remainder of the user plane data, from across the split fronthaul interface, at least one of the one or more subsequent packets being received during the second time period, wherein the user plane data included in the at least one subsequent packet received during the second time period is to be transmitted to the at least one user equipment as the second time-slot symbol.

18. The apparatus of claim 17, wherein the computer program code, when executed by the at least one processor, causes the apparatus:

to process the first data packet based on control information received from across the split fronthaul interface at the latest during the first time period.

19. A method comprising:

generating a first packet based on user plane data relating to one or more user equipment which is output by a first L1 PHY processing stage, the first packet including a proper subset of the user plane data which is to be transmitted over-the-air from a remote radio head to the one or more user equipment during a first time-slot symbol;

passing the first packet to a second L1 PHY processing stage across a split fronthaul interface in a first time period having a duration corresponding to a duration of transmission of the first time-slot symbol; and passing one or more subsequent packets including the remainder of the user plane data across the split fronthaul interface in one or more successive time periods which are immediately subsequent to the first time period.

20. A method comprising:

receiving, at a second L1 PHY processing stage from across a split fronthaul interface, a first packet including a proper subset of user plane data output by a first L1 PHY processing stage which is upstream of the split fronthaul interface, wherein the user plane data relates to one or more user equipment and wherein the proper subset of the user plane data is to be transmitted over-the-air from a remote radio head to at least one of the one or more user equipment as a first time-slot symbol, wherein the first packet is received in a first time period having a duration corresponding to a duration of transmission of the first time-slot symbol;

beginning processing of the first data packet prior to expiry of a second time period that is immediately subsequent to the first time period and which has a duration corresponding to a duration of transmission of a second time-slot symbol; and receiving one or more subsequent packets, which together include the remainder of the user plane data, from across the split fronthaul interface, at least one of the one or more subsequent packets being received during the second time period, wherein the user plane data included in the at least one subsequent packet received during the second time period is to be transmitted to the at least one user equipment as the second time-slot symbol.

* * * * *